Oct. 4, 1938.  W. P. CHANDLER, JR  2,132,146
APPARATUS FOR CLEANING GASES
Filed July 22, 1937   2 Sheets-Sheet 1
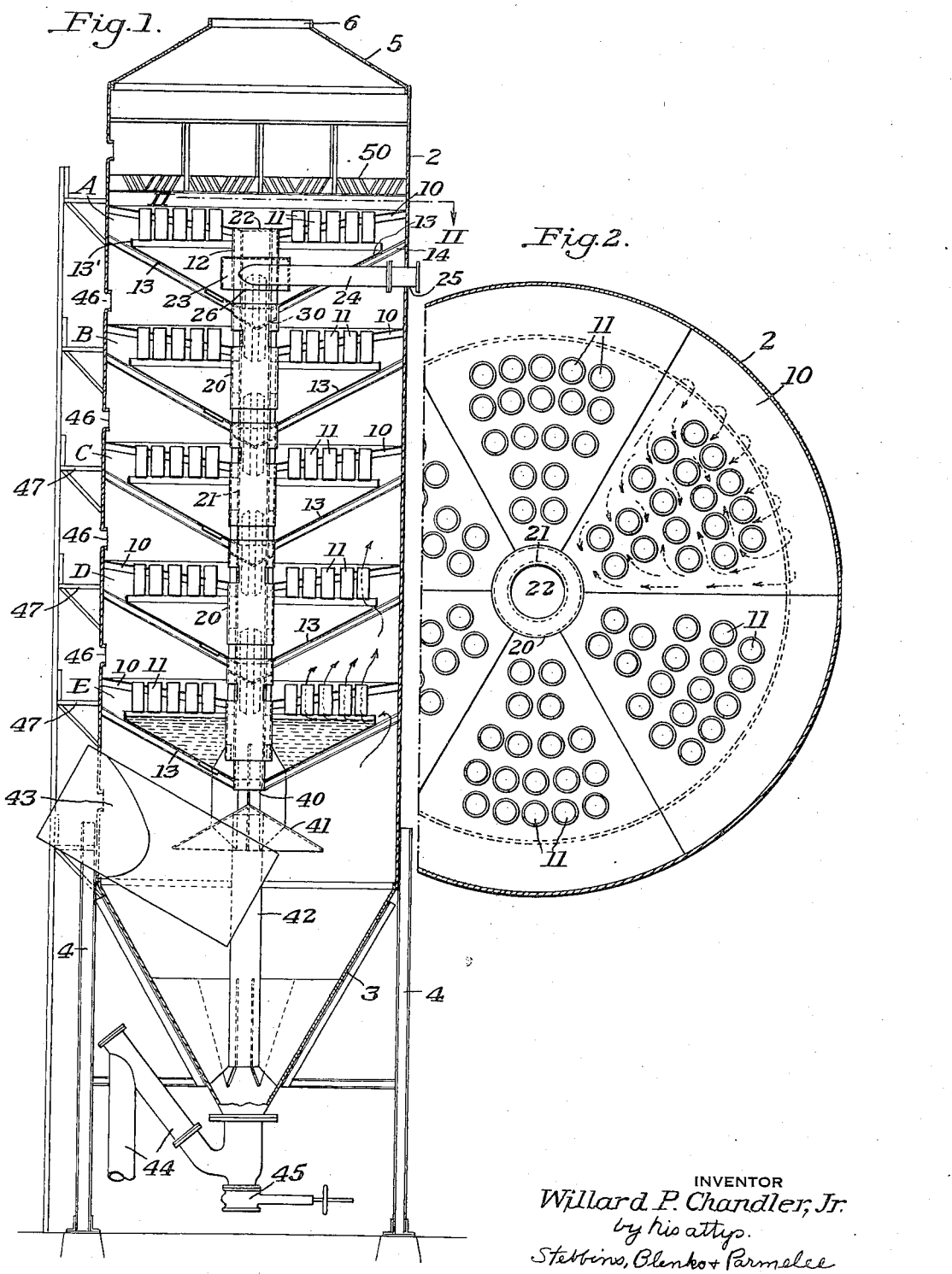
INVENTOR
Willard P. Chandler, Jr.
by his attys.
Stebbins, Blenko + Parmelee Oct. 4, 1938.　　W. P. CHANDLER, JR　　2,132,146
APPARATUS FOR CLEANING GASES
Filed July 22, 1937　　2 Sheets-Sheet 2
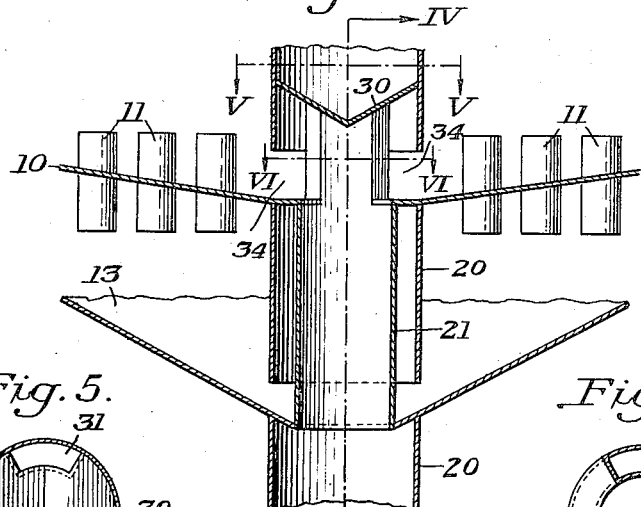
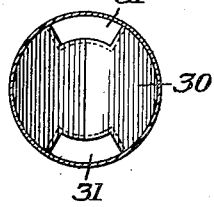
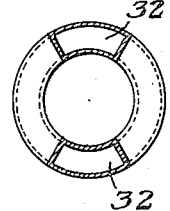
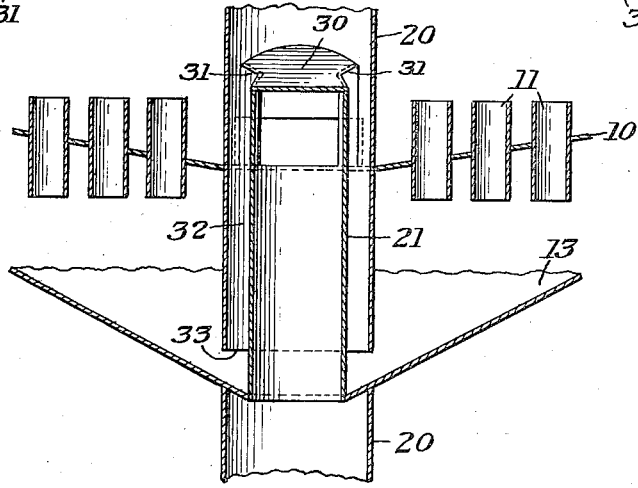
INVENTOR
Willard P. Chandler, Jr.
by his attys.
Stebbins, Blenko + Parmelee.

Patented Oct. 4, 1938

2,132,146

UNITED STATES PATENT OFFICE 2,132,146

APPARATUS FOR CLEANING GASES

Willard P. Chandler, Jr., Pittsburgh, Pa., assignor to Blaw-Knox Company, Pittsburgh, Pa., a corporation of New Jersey Application July 22, 1937, Serial No. 154,979

7 Claims. (Cl. 261—108)

The present invention relates generally to the contacting of liquid and gas and, more particularly, to apparatus for effecting repeated and efficient intimate contact between the liquid and the gas.

It is desirable in many instances to bring about an intimate contact between a liquid and a gas for the purpose of cleaning the gas or for the purpose of imparting a constituent or constituents to the gas from the liquid or for the purpose of taking something from the gas for purifying it or otherwise altering the character of the liquid or the gas. For instance, it is desirable to wash or clean gases, such as blast furnace gas, in order to remove solids which may be in the gas and which would be objectionable if permitted to remain therein. By way of further example there are many chemical processes in which chemical reactions take place between materials, one of which is a gas and the other a liquid and it is desirable to bring the liquid and gas into intimate contact with each other in the carrying out of this chemical reaction. Whether the purpose is to absorb something from the gas or whether it is to cause the gas to take up something from the liquid or whether the reaction is purely physical and involves merely the removal of solid particles from the gas by means of the liquid, the intimate and repeated mixture brought about in the apparatus which I provide enables the desired results to be obtained more efficiently and effectively than has heretofore been obtainable under the practices and apparatus of which I have knowledge.

Various methods and different forms of apparatus have been proposed heretofore for effecting intimate contact between the liquid and gas but all of these devices and methods with which I am familiar are objectionable for one reason or another. Either their first cost is high or they have relatively low efficiency in operation. The apparatus which I have invented represents a substantial improvement on the practices and apparatus of the prior art.

While the apparatus which I provide may be utilized for the accomplishment of any of the purposes above set forth and any others involving intimate contact between a liquid and a gas, my invention will be described herein as applied to the cleaning of blast furnace gas by means of water.

In accordance with my invention the gas is introduced tangentially of the main shell of the structure adjacent the bottom thereof and a centrifugal motion thereby imparted to the gas. In this portion of the structure the gas is brought into contact with a descending wall of water so that a large amount of the heavier particles of solid material are removed therefrom and so that any abrading action of the particles on the side walls of this portion of the structure may be eliminated. The gas then passes upwardly adjacent the exterior of the main shell and is caused to converge toward the center of the shell and pass upwardly through a plurality of contactor tubes. The gas in its passage through the contactor tubes circulates water from a pool of water positioned below the contactor tubes upwardly therethrough, the liquid being broken up into minute particles so that an intimate contact between the liquid and gas is obtained. The gas then passes upwardly adjacent the exterior of the shell and into a similar contact unit where further intimate contact between the liquid and gas is obtained by passing the gas upwardly through contactor tubes. Any desired number of contact units each having one or more contactor tubes can be utilized for effecting repeated intimate contact between the gas and the liquid. Adjacent the top of the shell a separator is provided for separating from the gas any particles of liquid which have been entrapped therein. The gas then passes out of the shell through an opening adjacent the top thereof.

The liquid with which the gas is contacted is supplied to the shell in the uppermost contact unit. This liquid is circulated upwardly through the top set of contactor tubes and then passes downwardly through a centrally disposed conduit structure. When the downwardly circulating water reaches the next lower contact unit it is caused to pass from the centrally disposed conduit structure into the pool beneath the contactor tubes in that contacting unit. From that pool, the water is circulated upwardly through the contactor tubes and then into the centrally disposed conduit structure. It is then caused to pass downwardly therethrough until it reaches the next lower contact unit where it is again fed to the pool beneath the contactor tubes of that unit and then circulated in the manner described above. This repeated circulation of the water upwardly through the contactor tubes is effected in each of the contact units embodied in the structure. After passing through the contactor tubes in the lowermost contact unit the water passes to the centrally disposed conduit structure and from there downwardly into the base section of the structure where it strikes a conically shaped hood which is provided for the purpose of forming a wall of water with which the incoming gas contacts. The water is then passed from the structure at the base thereof.

In the structure which I provide the partitions through which the contactor tubes extend and the diaphragm plates or water pans which hold the pool of water beneath each set of contactor tubes are conical. The use of the cone-shaped partitions carrying the contactor tubes permits the central conduit construction, which also provides water drainage between the successive stages or contact units, to carry a portion of the weight of the partitions and the contactor tubes. It also provides for a continual wash of water and solid material toward the central conduit structure. The use of the cone-shaped diaphragm plates or water pans permits a portion of the weight of the water and the pans to be carried by the central conduit construction. It also provides for a continual wash from the lowest point of the diaphragm plates or water pans upwardly along the bottoms thereof so as to prevent the settlement of any solids in the pans.

Thus it will be seen that in the structure which I provide the weight of the diaphragm plates, contactor tubes, water, etc., is carried partially by the outside shell and partially by the central conduit construction which provides the drainage between the successive stages. This is of considerable advantage in constructions of this character which are used for washing blast furnace gas as such structures are of considerable size. For example, the structure shown in the drawings is approximately 20 feet in diameter and 78 feet high. It will be apparent that the weight of the pans, the contactor tubes and the water employed in such a structure as this is quite appreciable and that without the arrangement provided by my invention a much heavier structure would be required.

It will also be apparent from the above that by the arrangement which I provide all pockets where water and solids would normally accumulate are eliminated and all of the solids taken from the gas conveyed to the bottom of the structure with the descending column of water so that they may be removed from a single point.

In the accompanying drawings I have shown for purposes of illustration only a preferred embodiment of my invention. In the drawings—

Figure 1 is a vertical sectional view taken through a gas cleaning apparatus in accordance with my invention;

Figure 2 is a partial section taken along the line II—II of Figure 1;

Figure 3 is a vertical section through a portion of the central conduit arrangement and through one of the partitions carrying the contactor tubes and the adjacent diaphragm or pan;

Figure 4 is a section taken along the line IV—IV of Figure 3;

Figure 5 is a section taken along the line V—V of Figure 3; and

Figure 6 is a section taken along the line VI—VI of Figure 3.

In the embodiment shown in the drawings there is provided a main shell 2 formed of sheet metal of suitable gauge. The shell is preferably cylindrical but it will be obvious that any other suitable shape may be utilized. The bottom portion of the structure is formed of a cone-shaped sheet metal portion 3 which is welded or otherwise suitably secured to the bottom of the shell 2. The shell and the dependent cone portion 3 are supported by suitably mounted supporting legs 4.

The shell is provided with a cover 5 at the upper end thereof which is provided with a gas discharge opening 6 centrally disposed therein.

Within the shell there are provided a plurality of contact units which are marked A, B, C, D and E. The contact unit A is provided with a partition 10 through which extend a plurality of contactor tubes 11. The partition 10 is formed of a plurality of segments and each segment at its outer end is secured to the shell 2 and at its inner end to the central conduit structure indicated generally by the reference character 12. The contact unit A is provided with and partially separated from the contact unit B located immediately therebelow by a conically shaped diaphragm plate or pan 13 supported on supporting members 14 extending from the outer shell 2 to the central conduit structure 12. The periphery of the pan 13 is turned upwardly as at 13' and the inner end of the pan 13 is secured to the central conduit structure and arranged relative thereto in a manner more specifically described hereinafter.

The contact unit B is similarly provided with a partition 10 through which contactor tubes 11 extend. It is also provided with a diaphragm plate or pan 13 similar to the pan of contact unit A, the diaphragm plate or pan of each unit being adapted to maintain a pool of water below the contactor tubes 11 and to partially separate each unit from the next lower unit.

The contact units C, D and E are similar to the contact units A and B and need not be specifically described. It will suffice to state that each unit is provided with a partition through which contactor tubes extend and a pan for supporting a pool of water and for separating the contact unit from the section immediately therebelow.

The central conduit structure indicated generally by the reference character 12 is formed of a plurality of outer pipe sections 20 and inner pipe sections or conduits 21. The upper end of the portion of the inner pipe member 21 in contacting unit A is open as indicated at 22 to permit any water or solid particles which have been circulated upwardly through the contactor tubes 11 to be passed downwardly through the inner conduit member 21. The upper end of the outer conduit member 20 within unit A is closed so that none of the liquid or solid particles which have been circulated up through the contactor tubes will pass downwardly therethrough. An appropriate connection indicated generally by the reference character 23 is effected between the outer conduit 20 within unit A and the water inlet pipe 24 which extends through the outer shell through an opening 25.

Water which is fed to the unit enters the space between the inner and outer conduit sections of the central conduit structure and is discharged from the central conduit section through a circular opening 26 between adjacent outer conduit sections of the central conduit structure. The water passing through the opening 26 passes into the liquid pool in the pan 13 and gas rising through the structure passes over the surface of the pool of liquid and upwardly through the contactor tubes and carries therewith a portion of the liquid in the pool. This water then enters the inner conduit member as described above and passes downwardly through the inner conduit member to the adjacent contact unit B.

In Figures 3 to 6, inclusive, I have shown generally the arrangement of the inner and outer conduit members of the central conduit structure embodied in units B, C, D and E. This structure is substantially the same as that described above as being embodied in contact unit A but, as is apparent, that portion of the central conduit structure embodied in contact unit A is not provided with the diversion diaphragm or plate which is embodied in that portion of the central conduit structure which is embodied in units B, C, D and E.

As stated above, liquid and any solid particles which have been circulated through the contactor tubes of unit A are passed downwardly through the inner conduit member and delivered to contact unit B. The inner conduit member through which the water and solids descend from contact unit A to contact unit B terminates at the point where the pan of contact unit A joins the central conduit structure. The water passing downwardly through the inner conduit member is discharged into the outer conduit member of the central conduit structure in unit B. This outer conduit member 20 of unit B is provided with a diversion diaphragm or plate 30 extending transversely thereof at an angle to the horizontal. The water descending through the conduit 20 strikes the diversion plate and then passes through openings 31 therein for diverting the water through a passageway 32 between the inner and outer conduit members 20 and 21 of that portion of the central conduit structure located in unit B. The outer conduit 20 terminates above the pan 13 of unit B so as to provide an opening 33 similar to the opening 26 of unit A for discharging the water which has been circulated from contact unit A to the pool of water in contact unit B, the water being discharged at the base of the pool so as to give a continual wash upwardly along the pan to prevent the settlement of solid particles in the pool of water.

By virtue of the gas passing from contact unit C into contact unit B and over the pool of water in contact unit B and upwardly through the contactor tubes 11 thereof, the water and any solid material in the pool of contact unit B is circulated upwardly through the contactor tube and deposited on the partition 10 thereof. The water and solid material then wash over the partition and are discharged into the central conduit structure through openings 34. The partition through which the contactor tubes of unit B is connected with the inner conduit 21 of the central conduit structure so that the water and solid material are fed to the inner conduit member 21, the partition plate covering the upper end of the space between the inner and outer conduit members. This water and any solids carried thereby pass downwardly by the inner conduit member 21 and are discharged into the outer conduit member 20 of the next succeeding contactor unit.

The arrangement of the inner and outer conduit members of the central conduit structures in contact units C, D and E is identical with that just described with respect to contact unit B.

Water and solid material passing downwardly through the inner conduit member of the lowermost contact unit E are discharged through an opening 40 into the lower part of the shell. A cone-shaped hood 41 is supported on the supporting structure 42 of the central conduit structure and is positioned below the opening 40 so that water discharged therefrom flows downwardly over the hood and is discharged onto the side walls of the bottom portion of the structure in the form of a falling wall of water through which gas entering the structure through the tangential gas inlet 43 must pass as it enters the cleaner. This falling wall of water protects the side walls of the structure from the abrading effects of solids contained in the incoming gas.

Water and any solid material removed from the gas is collected in the lower portion of the structure and is discharged therefrom through conduits 44. A cleanout valve 45 is provided for cleaning out the lower end of the unit.

While the structure described above is of such character as to prevent the collection of any solid material at any point within the structure, cleanout openings 46 are provided in the side walls of the shell to permit access to the contactor units for cleaning or repair purposes. Galleries 47 are provided along the side walls of the structure to permit inspection, cleaning and repair of the structure.

A separator 50 is provided in the upper portion of the structure for eliminating any water which may be entrapped in the rising gas before it is discharged from the gas outlet opening 6 in the top of this structure.

The rising gas passes from one contact unit to the next succeeding contact unit around the periphery of the shell, the pans for retaining the pools of water in the respective units being spaced from the side walls. As the gas passes from one unit to another about the periphery it passes inwardly around the contactor tubes and upwardly therethrough. As shown in Figure 2, the contactor tubes in each segment of each partition plate are so arranged as to permit the flow of gas inwardly from the periphery of the structure so that each of the contactor tubes will function to carry upwardly a portion of the circulated liquid and gas. The two outer rows of contactor tubes in each segment are provided with five contactor tubes in the embodiment shown. The third row of tubes is provided with four tubes. The two inner rows are each provided with two tubes. The tubes in each segment are spaced apart a sufficient distance to permit the gas to circulate therearound so as to provide proper convergence of the gas from all sides of each tube.

In operation, water is passed into the structure through the water inlet 24 upwardly through the pool in contact unit A, upwardly through the contactor tube in unit A, then downwardly through the central conduit structure to unit B where it is discharged into the pool of unit B at the base thereof. The water is circulated through units B, C, D and E in the same manner as through unit A and is then discharged from the opening 40 onto the hood 41 into the base of the structure. Gas is fed to the unit through the tangential opening 43 and then passes upwardly around the periphery of the structure between the pan in unit E and the outer shell. It then passes over the surface of the pool of water in contact unit E, upwardly through the contactor tubes in unit E and is discharged into unit D between the water pan in unit D and the outer shell. In a similar manner the gas continues upwardly through units D, C, B and A and then passes through the separator 50 and is discharged from the structure through the discharge opening 6.

The partition plates through which the contactor tubes pass in each unit are in the form of inverted cones. Likewise the pans or diaphragm plates separating the contact units are in the form of inverted cones. This is of considerable advantage in a structure of this character as it permits the weight of the diaphragm plates, the contactor tubes, the water, etc., to be carried partially by the outside shell and partially by the central column construction which also provides water drainage between the successive stages. This arrangement is advantageous for the further reason that it provides a structure which is entirely free of any catch pockets where solid particles may collect. The wash on the diaphragm plates or pans is continuously upwardly from the lowest point of each pan so that there is no possibility of any solids settling in the pan. The wash on the partition plates is toward the central conduit structure and by reason of this arrangement and the fact that the plates are in the form of inverted cones there is no possibility of solids collecting thereon.

In short, the structure which I provide is of such character to prevent any solids from settling at any point in the structure. The structure which I provide is therefore far more efficient than any of the prior art structures.

While I have shown and described a preferred embodiment of my invention it will be apparent that my invention may be otherwise embodied without departing from the spirit thereof within the scope of the appended claims.

I claim:

1. A gas treating apparatus comprising a shell having a gas inlet opening communicating therewith adjacent one end thereof and a gas outlet adjacent the other end thereof, a cone-shaped partition extending transversely across the shell between the inlet and outlet openings, a plurality of contactor tubes opening through said partition, a cone-shaped pan for maintaining a liquid pool below the partition and adjacent the lower ends of the contactor tubes, a centrally disposed conduit structure extending through said partition and said pan, and means for supplying liquid to said conduit structure above said partition, said conduit structure having a passageway extending from above said partition and opening into the base of the said pool, whereby liquid is supplied to said pool, and a passageway in said conduit structure communicating with the upper surface of said partition and extending completely through the said pool, whereby liquid carried upwardly through said contactor tubes and deposited on said partition may be discharged below the pool.

2. A gas treating apparatus comprising a shell having a gas inlet opening communicating therewith adjacent one end thereof and a gas outlet adjacent the other end thereof, a cone-shaped partition extending transversely across the shell between the inlet and outlet opening, a plurality of contactor tubes opening through said partition, a cone-shaped pan for maintaining a liquid pool below the partition and adjacent the lower ends of the contactor tubes, a centrally disposed conduit structure extending through said partition and said diaphragm, and means for supplying liquid to said conduit structure above said partition, said conduit structure having a passageway extending from above said partition and opening into the base of the said pool, whereby liquid is supplied to said pool, a passageway in said conduit structure communicating with the upper surface of said partition and extending completely through the said pool, whereby liquid carried upwardly through said contactor tubes and deposited on said partition may be discharged below the pool, and means below said conduit structure and said pool for diverting liquid discharged from the conduit structure to the side walls of the shell between the side walls and the inlet opening.

3. A gas treating apparatus comprising a shell having a gas inlet opening adjacent one end thereof and a gas outlet opening adjacent the other end thereof, a plurality of superimposed contact units between the inlet and outlet openings, each contact unit comprising a cone-shaped partition having contactor tubes therethrough and a cone-shaped pan for maintaining a pool of liquid adjacent the lower ends of the tubes, means including a centrally disposed conduit structure for supplying liquid from above the partition in one unit to the base of the pool in the next lower unit, and means for supplying liquid to the base of the pool in the uppermost contacting unit.

4. A gas treating apparatus comprising a shell having a gas inlet opening adjacent one end thereof and a gas outlet opening adjacent the other end thereof, a plurality of superimposed contact units between the inlet and outlet openings, each contact unit comprising a cone-shaped partition having contactor tubes therethrough and a cone-shaped pan for maintaining a pool of liquid adjacent the lower ends of the tubes, means including a centrally disposed conduit structure extending through the apex of said partition and of said pan for supplying liquid from above the partition in one unit to the base of the pool in the next lower unit, means for supplying liquid to the base of the pool in the uppermost contacting unit, and means for discharging liquid from said shell adjacent the lower end thereof.

5. A gas treating apparatus comprising a shell, a plurality of superimposed contact units therein, each comprising a cone-shaped partition having contactor tubes therethrough and a cone-shaped pan for maintaining a pool of water adjacent the lower ends of said contactor tubes, means including a centrally disposed conduit structure extending through the apex of said pan and through said partition for supplying liquid from above the partition in one unit to the pool in the next adjacent unit, and a separator within the shell above said contact units.

6. A gas treating apparatus comprising a shell, a plurality of superimposed contact units therein, each comprising a cone-shaped partition having a contactor tube therethrough and a cone-shaped pan for maintaining a pool of water adjacent the lower end of said contactor tube, and means including a centrally disposed conduit structure for supplying liquid from above the partition in one unit to the base of the pool in the next adjacent unit.

7. A gas treating apparatus comprising a shell having a gas inlet opening adjacent one end thereof and a gas outlet opening adjacent the other end thereof, a plurality of superimposed contact units between the inlet and outlet openings, each contact unit comprising a cone-shaped partition having contactor tubes therethrough and a cone-shaped pan for maintaining a pool of liquid adjacent the lower ends of the tubes, and means including a centrally disposed conduit structure for supplying liquid from above the partition in one unit to the bottom of the pool in the next lower unit.

WILLARD P. CHANDLER, Jr.